Figure 6:
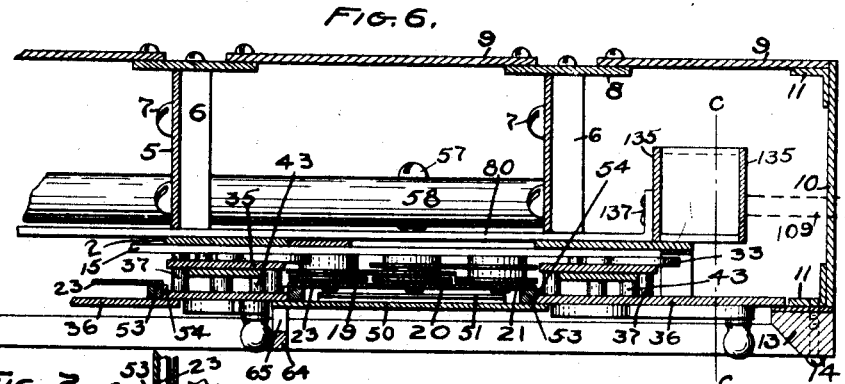

E. B. CUMMINGS.
VOTING MACHINE.
APPLICATION FILED MAR. 8, 1900.
1,010,596.
Patented Dec. 5, 1911.
11 SHEETS—SHEET 1.
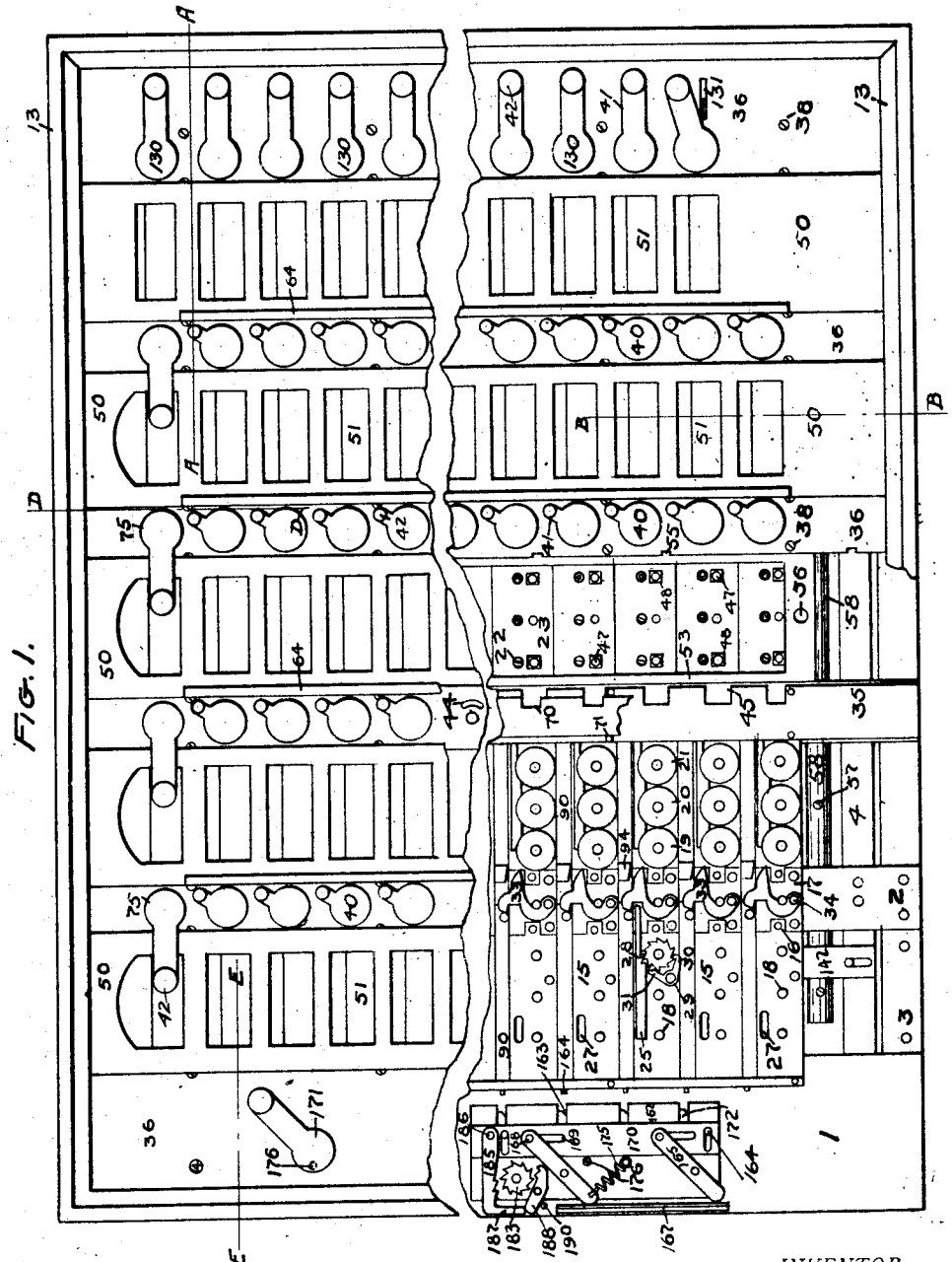
WITNESSES:
G. H. Blaker.
M. C. Buck
INVENTOR.
Edwin B. Cummings
BY V. H. Lockwood
His ATTORNEY.

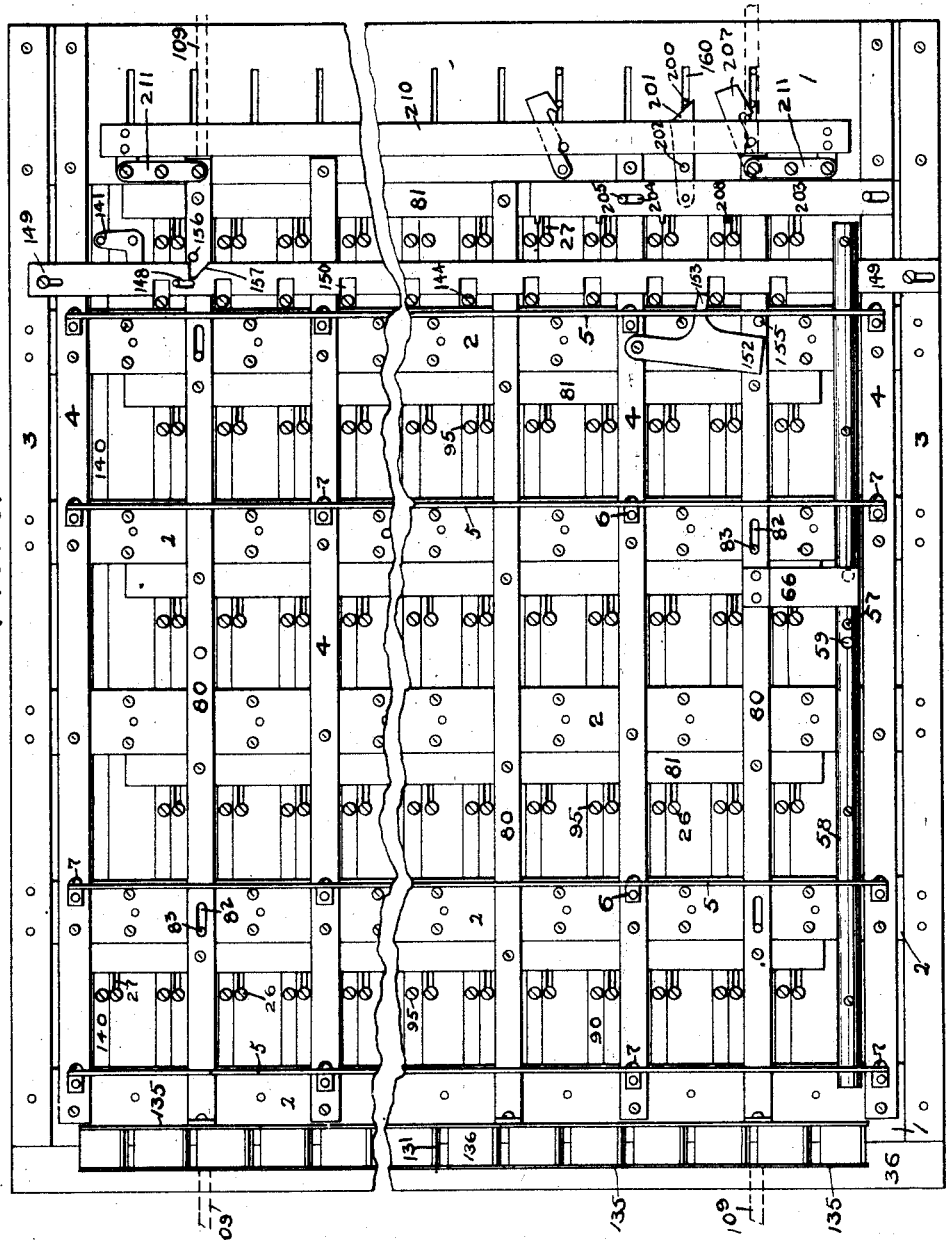

E. B. CUMMINGS.
VOTING MACHINE.
APPLICATION FILED MAR. 8, 1900.
1,010,596.
Patented Dec. 5, 1911.
11 SHEETS—SHEET 3.
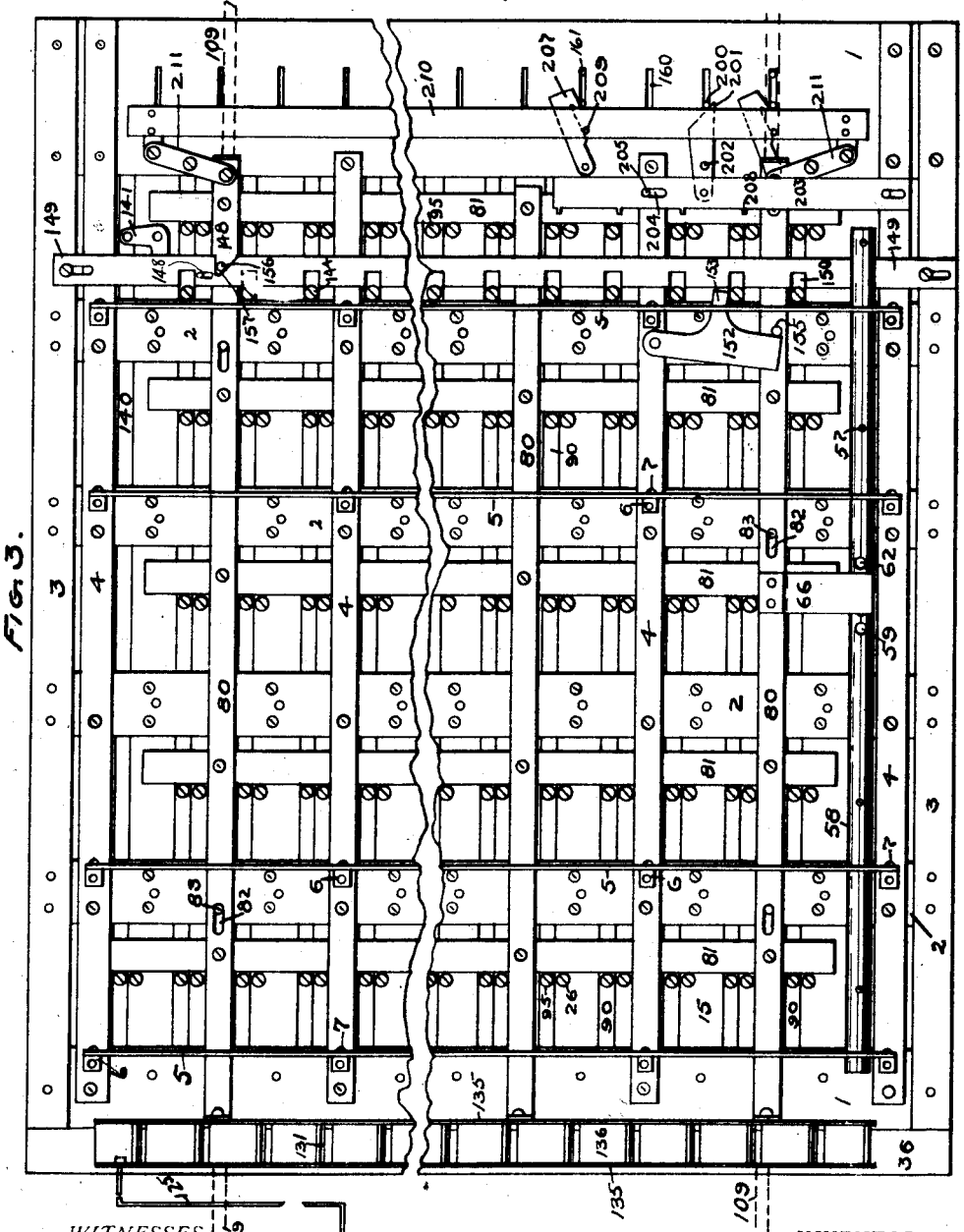
WITNESSES
G. H. Blaker
M. C. Buck
INVENTOR.
Edwin B. Cummings.
BY V. H. Lockwood
His ATTORNEY.

E. B. CUMMINGS.
VOTING MACHINE.
APPLICATION FILED MAR. 8, 1900.
1,010,596.
Patented Dec. 5, 1911.
11 SHEETS—SHEET 4.
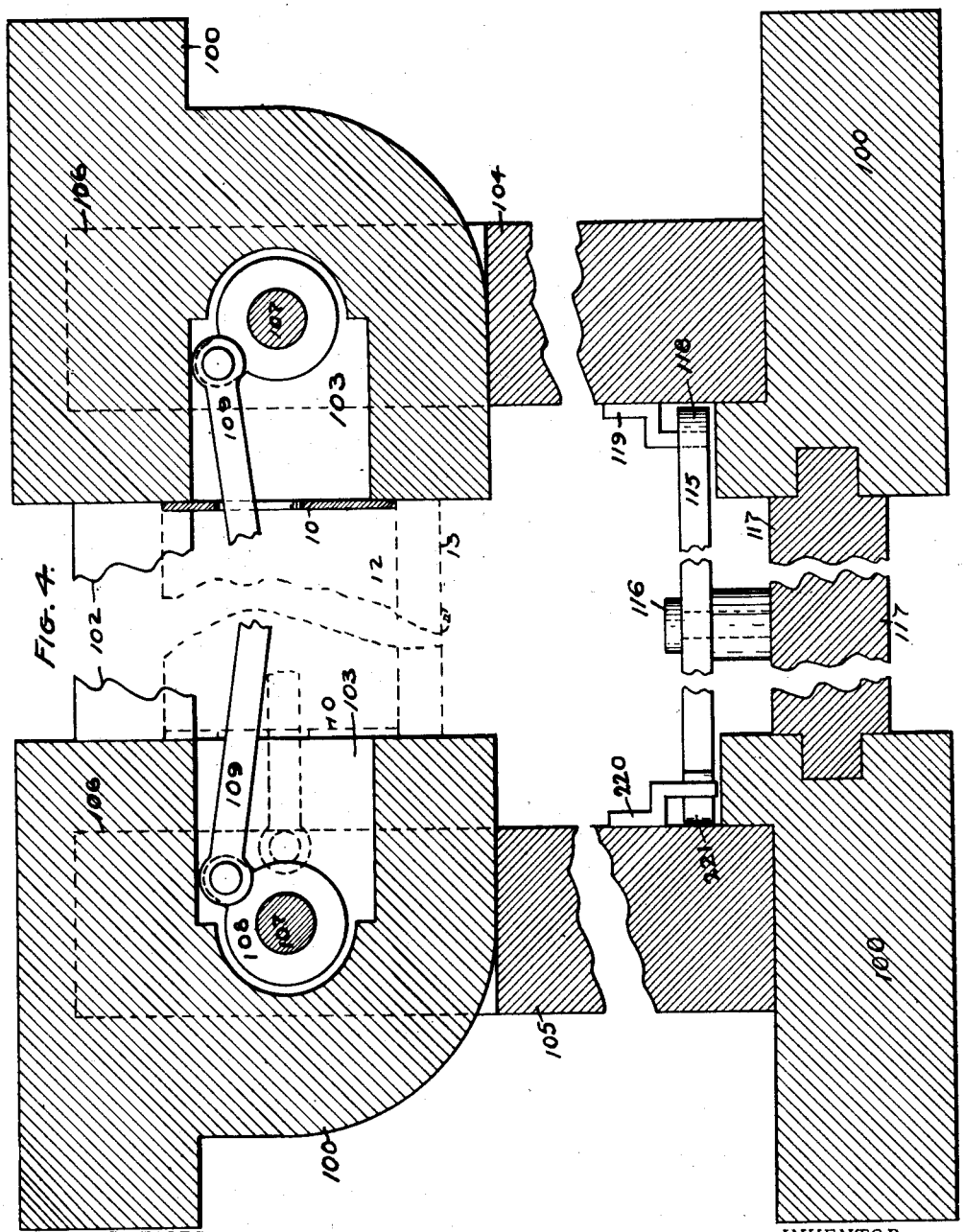

E. B. CUMMINGS.
VOTING MACHINE.
APPLICATION FILED MAR. 8, 1900.
1,010,596.
Patented Dec. 5, 1911.
11 SHEETS—SHEET 5.
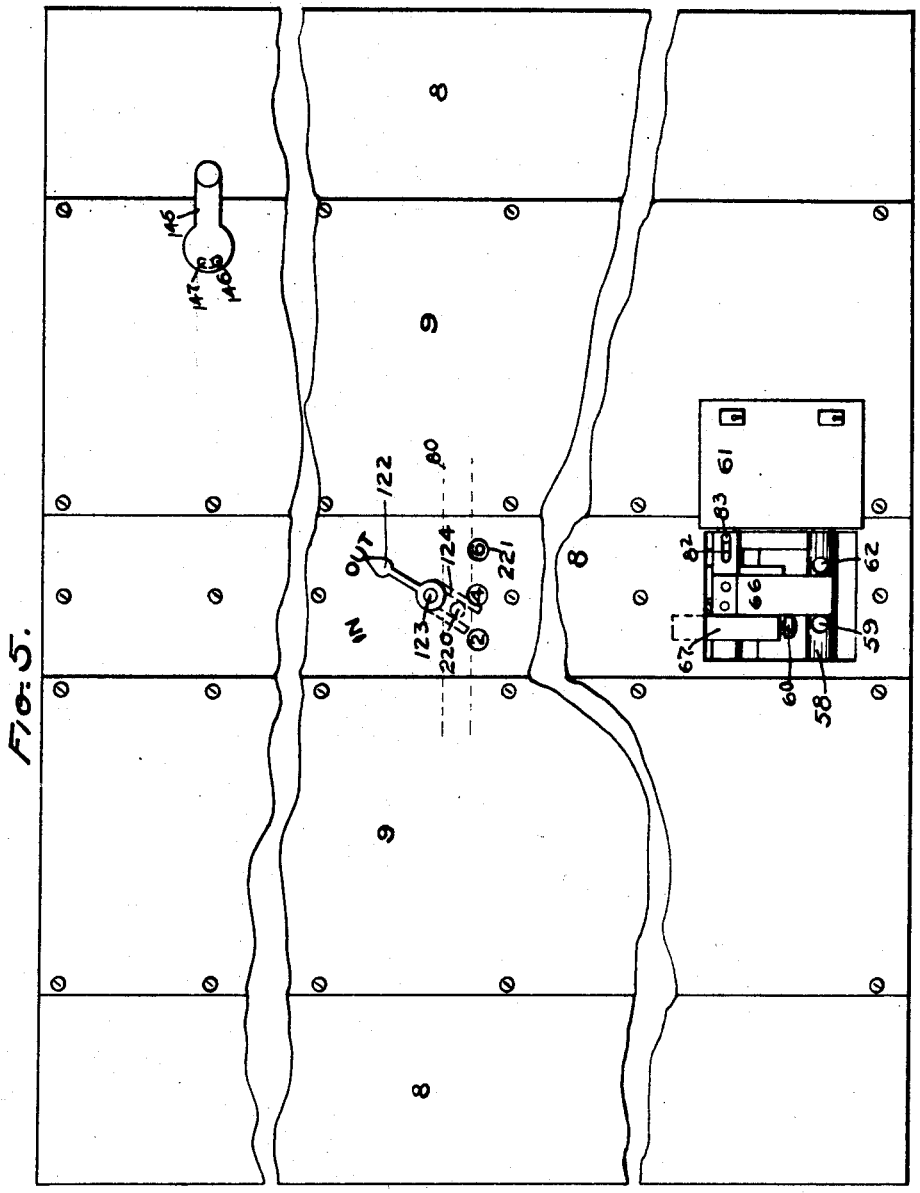
WITNESSES:
G. H. Blaker
M. C. Buck
INVENTOR.
Edwin B. Cummings
BY Lockwood
His ATTORNEY.

E. B. CUMMINGS.
VOTING MACHINE.
APPLICATION FILED MAR. 8, 1900.

1,010,596.

Patented Dec. 5, 1911.
11 SHEETS—SHEET 6.

WITNESSES:
G. H. Blaker
M. C. Buck

INVENTOR.
Edwin B. Cummings
BY V. H. Lockwood
His ATTORNEY

E. B. CUMMINGS.
VOTING MACHINE.
APPLICATION FILED MAR. 8, 1900.
1,010,596.
Patented Dec. 5, 1911.
11 SHEETS—SHEET 7.
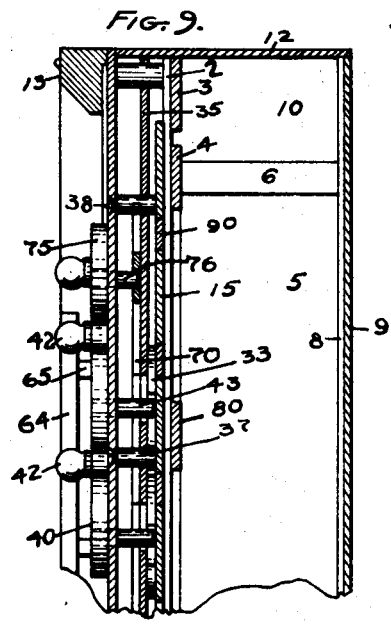
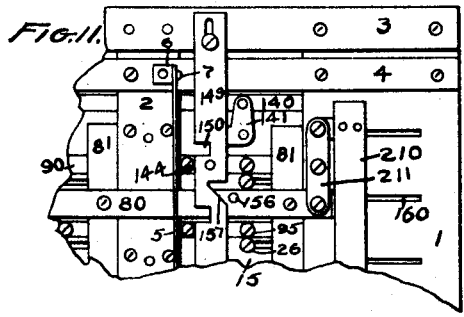
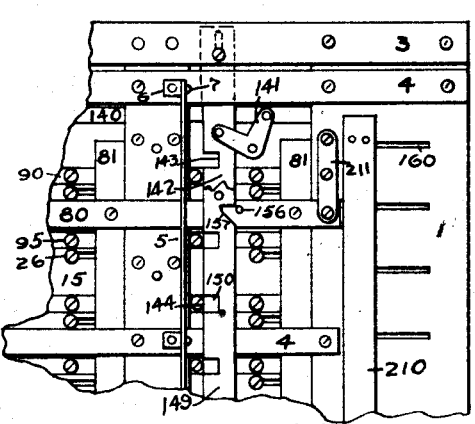
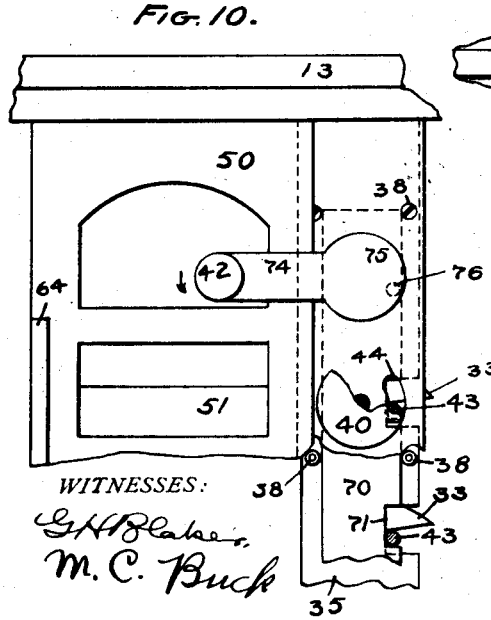
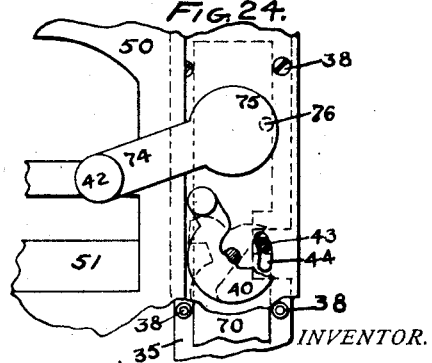

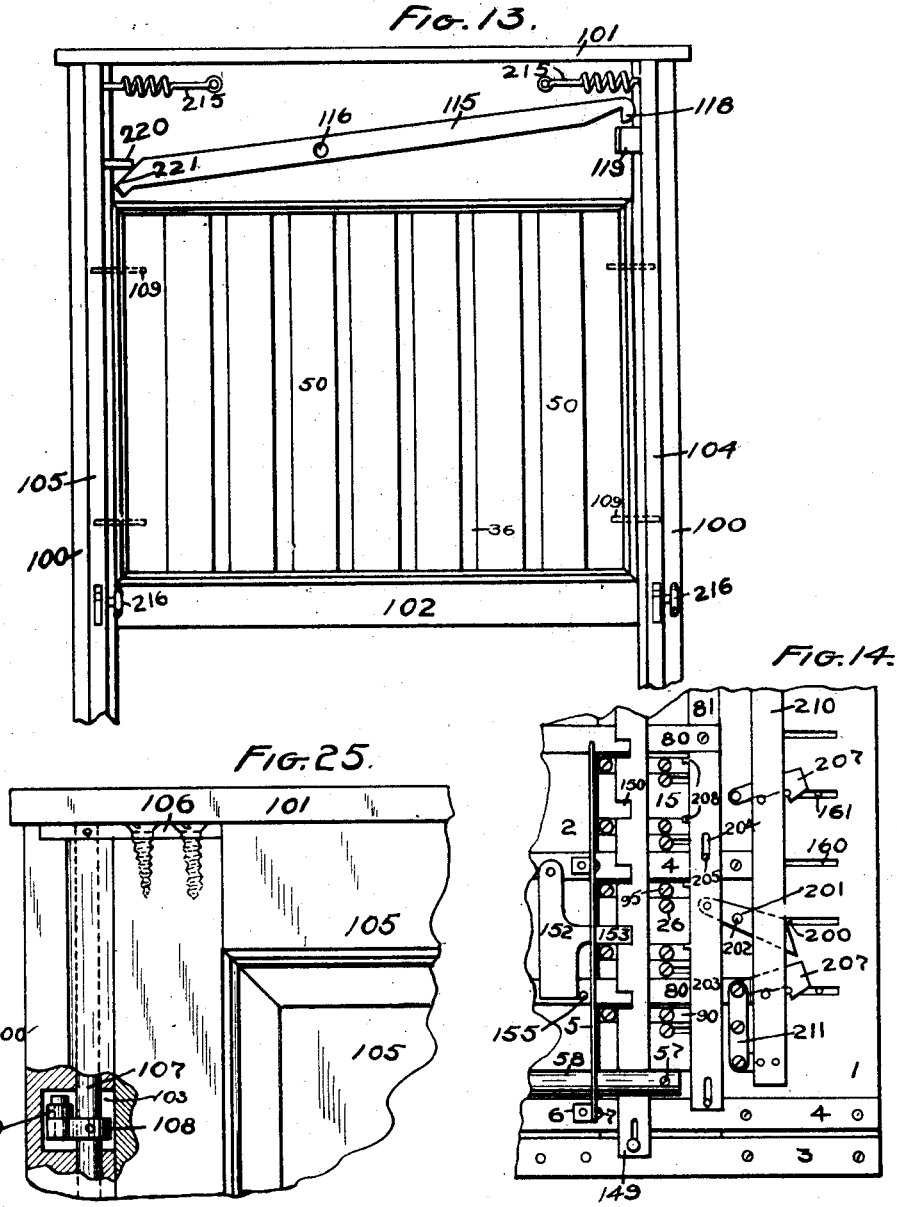

E. B. CUMMINGS.
VOTING MACHINE.
APPLICATION FILED MAR. 8, 1900.
1,010,596.
Patented Dec. 5, 1911.
11 SHEETS—SHEET 9.
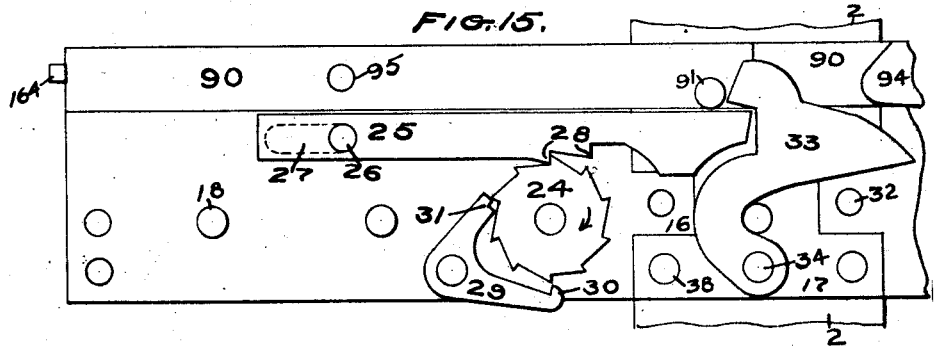
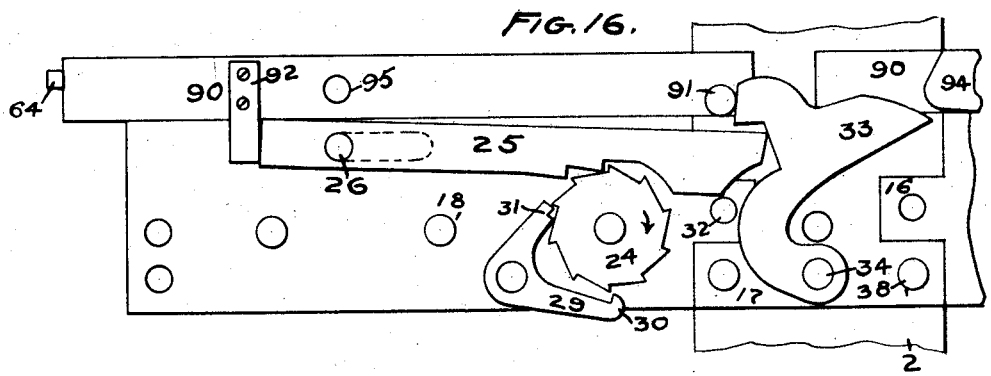
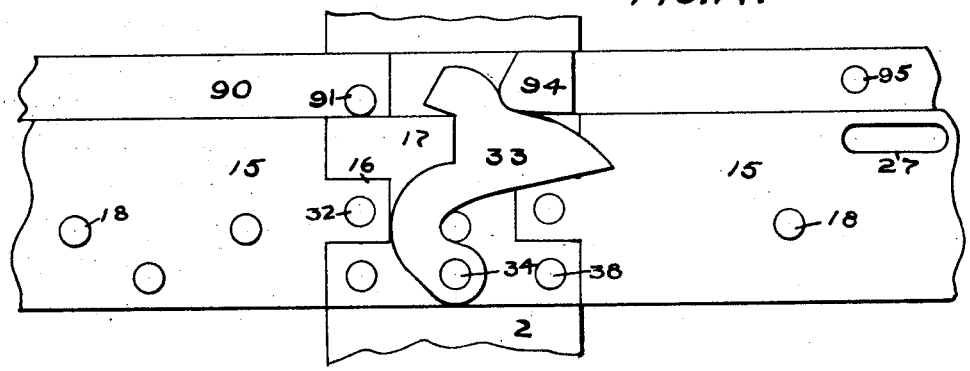
WITNESSES:
INVENTOR.
Edwin B. Cummings
BY V. H. Lockwood
His ATTORNEY.

E. B. CUMMINGS.
VOTING MACHINE.
APPLICATION FILED MAR. 8, 1900.

1,010,596.

Patented Dec. 5, 1911.
11 SHEETS—SHEET 10.

WITNESSES:
G. H. Blaker
M. C. Buck

INVENTOR.
Edwin B. Cummings.
BY V. H. Lockwood
His ATTORNEY.

E. B. CUMMINGS.
VOTING MACHINE.
APPLICATION FILED MAR. 8, 1900.

1,010,596.

Patented Dec. 5, 1911.
11 SHEETS—SHEET 11.

WITNESSES:
Laura Hitt
G H Blaker

INVENTOR.
Edwin B. Cummings
BY V. H. Lockwood
His ATTORNEY.

UNITED STATES PATENT OFFICE.

EDWIN B. CUMMINGS, OF INDIANAPOLIS, INDIANA.

VOTING-MACHINE.

1,010,596.   Specification of Letters Patent.   Patented Dec. 5, 1911.

Application filed March 8, 1900. Serial No. 7,848.

*To all whom it may concern:*

Be it known that I, EDWIN B. CUMMINGS, of Indianapolis, county of Marion, and State of Indiana, have invented a certain new and useful Voting-Machine; and I do hereby declare that the following is a full, clear, and exact description thereof, reference being had to the accompanying drawings, in which like letters refer to like parts.

The object of this invention is to simplify and improve the construction and operation of voting machines.

This invention is a carrying forward of my former inventions set forth in Letters Patent Nos. 585,742 and 585,743 dated July 6, 1897.

Aside from accurate, full and successful operation of the machine, one of the main objects sought is compactness and lightness whereby the machine can be readily transported and handled. Furthermore, the principles of its construction are so simple as to be understood by mechanics of ordinary skill. The machine is also so arranged that it can be extended to accommodate any number of officers or tickets. It is adapted for voting straight tickets or for individual candidates or mixed tickets, for multiple voting and for accommodating limited voters and voting for candidates not on the regular ticket.

One feature of this invention consists in means for indicating to persons outside of the voting room the number of voters, and the number of times the machine has been operated. In other words, it discloses to those outside every movement of the machine that affects the registration of votes. This information may be thus furnished to parties immediately outside of the voting room or by suitable connections to persons at political headquarters or any other distant place. Hence this not only informs those outside at any time on election day of the number of votes that have been cast but it serves as a check upon any improper manipulation of the machine.

Another feature of this invention consists in means providing for the accommodation of a new ticket which has been brought out just before the election and after all the regular spaces have been occupied by other parties or tickets. This is accomplished here by providing a key like the other straight ticket keys and a suitable card or ticket receptacle in which the new ticket may be introduced after the operation of the key and when the key is thus operated the machine will be wholly locked against any further voting for any ticket or any candidate.

An important feature of this invention consists in operating all of the registers for the candidates being voted for simultaneously by the opening of the door as he leaves the booth or a similar automatic means, such as a lever or a platform. To this end the operation of the key by the voter does not actuate the register but sets a pawl in position to actuate the register and this pawl is operated by means that is set in motion by the opening of the exit door or lever. To accomplish this purpose, as well as many others, I have constructed this machine with what may be called two general frames, one a stationary frame and another a grid-iron laterally movable frame that is operated, at least in the machine herein shown, by the entrance and exit doors. The grid-iron frame works to and fro in the stationary frame. Also everything is so arranged as to actuate by pushing and is therefore disconnected and independent, so that no backward movement of anything affects the operation of the machine in any way. The advantage of this is that when any part has been operated sufficiently far to accomplish its work any further movement of it will have no effect.

Another feature of the invention consists in the booth and arrangement of the doors. The entrance door when opened can only move outward and its opening returns, through the action of the grid-iron frame, various parts of the machine to their unoperated position ready for use. The entrance door is provided with a spring catch operated by a knob on the outside. A spring closes the door when the voter enters and no knob is provided on the inside so that he can not return by this door but must go out through the exit door. Likewise the exit door has a spring to close it and a knob on the inside to actuate it and no knob on the outside so a voter can not come in the wrong way. Also a latch is provided for catching the entrance door and holding it closed while the exit door is open but is so arranged that when the exit door is closed it releases the latch on the entrance door whereby it can be opened. By this means no voter can enter the booth while the preceding voter is leaving it and before he has effaced from the machine all means of showing how he has voted by return of the keys to their normal position. It also prevents opposing action of the two doors of the machine.

Another feature of the invention consists in mounting on a separate plate all of the registering wheels that operate for the benefit of a single candidate and means for actuating such wheels. These form groups or sections for each candidate and are alike so that they can be independently removed and replaced and are interchangeable and enable the machine to be enlarged in any direction.

Another feature consists in the ballot holder and the construction whereby it can be readily removed or inserted in place; also in means for indicating to persons in the room whether a voter is in the booth or not.

Another feature of the invention consists in providing means to accommodate limited voters, that is, persons who are entitled to vote only for some of the tickets or candidates. To that end means are provided for the election officers, when a limited voter is ready to enter the booth, by operating a key or other means to lock all the locking bars for all the candidates that the limited voter is not entitled to vote for and thus restrict the scope of suffrage.

Another feature consists in making certain improvements in the repeater to provide for multiple voting.

These with the other features of my invention will more fully appear from the accompanying drawings and the description following of one form of device embodying said invention; and the scope of the invention will be understood from the claims following said description.

Figure 7:
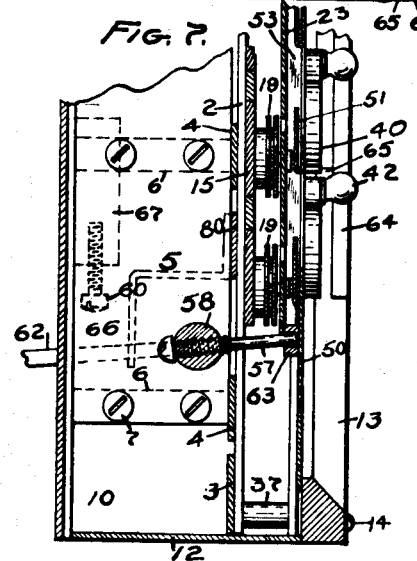
Figure 8:
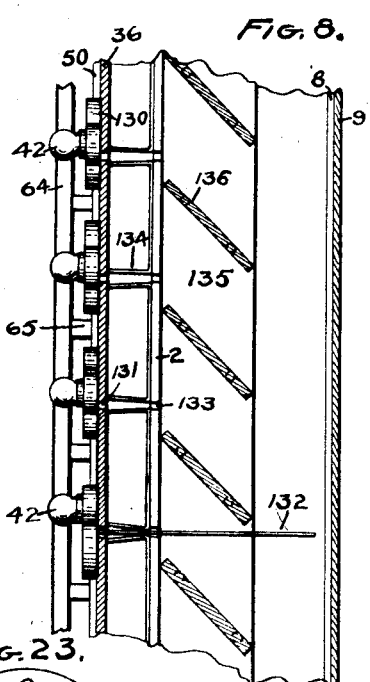
Figure 22:
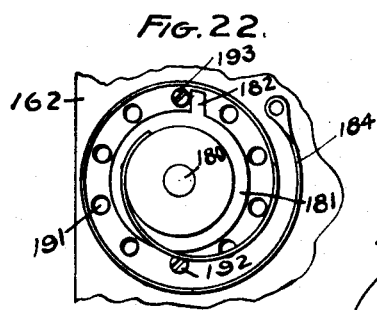
Figure 23:
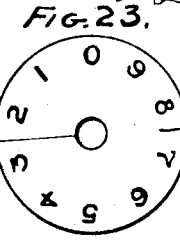
Figure 18:
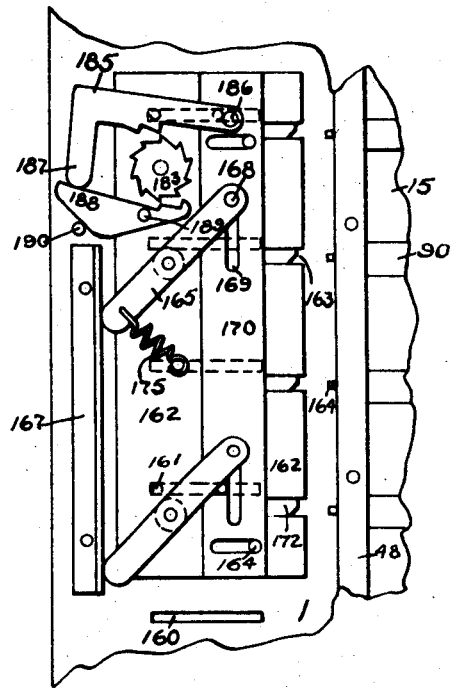
Figure 19:
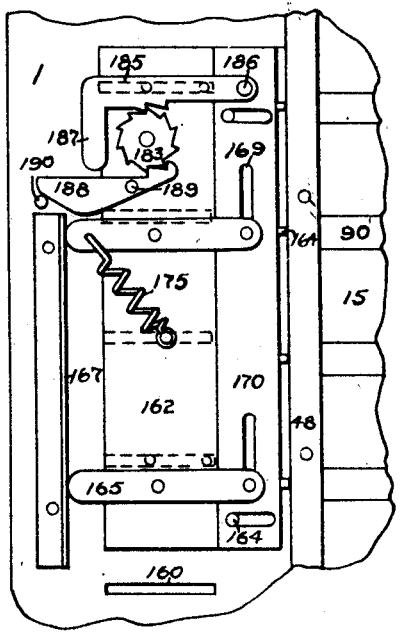
Figure 20:
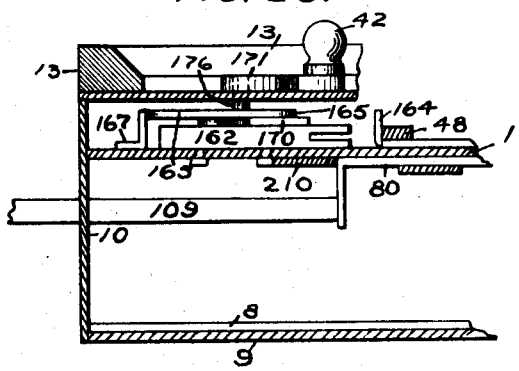
Figure 21:
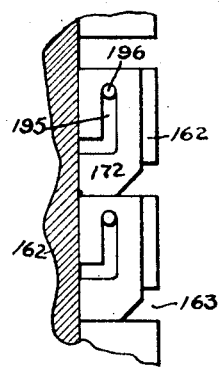
Figure 26:
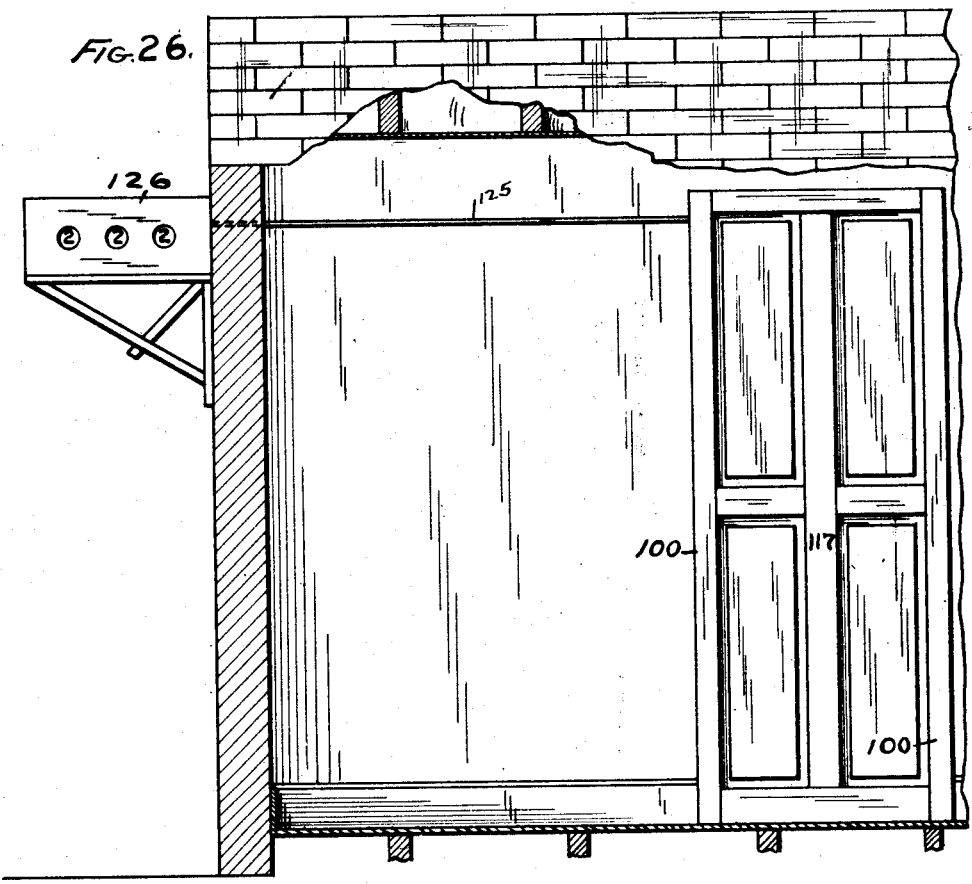
Figure 27:
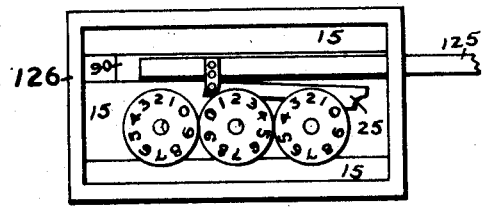

In the drawings Figure 1 is a front elevation of the voting machine independent of the booth, centrally broken away and with portions of the lower part removed to make the construction plain. Fig. 2 is a rear elevation of the portion shown in Fig. 1 with the back casing or plate of the machine removed, showing the machine in an unlocked position, the central parts being broken away. Fig. 3 shows the same as Fig. 2 with the machine in the locked position. Fig. 4 is a cross section of the booth in which the voting machine proper is mounted with parts centrally broken away and showing the means for actuating the voting machine by the doors. Fig. 5 is a rear elevation of the voting machine proper with the back casing on, the same being broken away as shown. Fig. 6 is a horizontal cross section of the voting machine on the line A—A of Fig. 1. Fig. 7 is a cross section of the voting machine on the line B—B of Fig. 1. Fig. 8 is a cross section on the line C—C of Fig. 6 excepting that the keys are not show. in section but in end elevation. Fig. 9 is a vertical cross section on the line D—D of Fig. 1. Fig. 10 is a front elevation of a portion of the voting machine with the parts broken away to show the means for voting a straight ticket. Fig. 11 shows the upper right hand corner of Fig. 2 with the limited ticket bar operated. Fig. 12 shows the same as Fig. 11 with the upper part of the limited ticket bar broken away to reveal the means whereby voting an irregular ticket locks the rest of the machine. Fig. 13 is a cross section of the upper part of the booth showing the voting machine proper in front elevation as the voter looks at it while voting and showing above means for locking the entrance door. Fig. 14 is the lower right hand corner of Fig. 2 showing the parts in position after the machine has been set for voting the limited ticket. Fig. 15 is an elevation of the means for operating the locking bar and setting the parts in position for actuation of the registering mechanism, while said parts are in unoperated position. Fig. 16 is the same as Fig. 15 showing the parts operated by the key. Fig. 17 shows the same parts as Fig. 15 excepting the register and pawl, with the parts locked. Fig. 18 is a front elevation of the repeater enlarged with the parts in unoperated position. Fig. 19 is the same with the parts in the operated position. Fig. 20 is a section on the line E—E of Fig. 1. Fig. 21 is an elevation of the locking means in the repeater for preventing the operation of more than one key at a time. Figs. 22 and 23 are details of the stop and indicating mechanisms of the repeater. Fig. 24 is a detail of part of Fig. 10 after the keys are operated. Fig. 25 is a detail of the means whereby the door operates the machine. Fig. 26 is an elevation of a part of a building showing a voting room, the parts being in section, with a voting booth in the room, a register and indicator outside the room and building and a connection between the two. Fig. 27 is an elevation of the register shown in Fig. 26 with the front plate removed.

Referring now to the details of construction of the machine herein shown for the purpose of illustrating the nature of this invention and giving attention in the first place to the voting machine proper independent of the booth in which it is mounted and whereby it is partly operated, a frame is formed of the vertical plates 1 and 2 and the horizontal plates 3 and 4 and the vertical reinforcing plates or bars 5. The plates 1, 2, 3 and 4 are flat plates riveted on each other as shown and the plates 4 are secured to the posts 6 to which are screwed the plates 5 by means of the screw 7. The plates 1 and 2 are in the same plane, the plates 1 being at the ends and the plates 2 between the ends of the machine. There are two of the horizontal plates 3, one at the bottom and one at the top, that are secured to the plates 1 and 2. There is one of the plates 2 for each ticket or space for a ticket. The plates 4 are in the same plane as the plates 3 and are screwed to plates 1 and 2 whereby the plates 4, 5 and 6 are removable. The plates 5 extend at a right angle from the frame composed of the plates 1, 2, 3 and 4 in order to give to such frame rigidity.

Across the back of the machine, as appears in the upper part of Fig. 6, I screw to the posts 6 vertical plates 8 to which the vertical plates 9 are screwed, as appears in said Fig. 6. At each side of the machine there is a vertical plate 10 secured to the lateral plates 9 by angle irons 11 and similar plates 12 are provided at the top and bottom. All about the face of the machine a suitable molding 13 is secured by the screws 14 to the angle-iron 11 that is attached to the side and bottom of the plates 10 and 12. All these parts are made preferably of metal.

The foregoing constitutes the general frame of the voting machine proper. As stated the plates 1 and 2 divide the machine into vertical sections for the various tickets or parties. In these sections suitable registering mechanisms are mounted one above the other, one set for each candidate. The registering mechanisms and the means upon which they are mounted form together independent groups whereby they may be singly removed or replaced as desired. One of said groups consists of the plate 15 whose ends are secured to the plate 2 by a screw. Each end of said plate 15 is provided with an extension 16 that enters suitable recesses in the opposite sides of the plates 17 which is secured on the face of the plate 2. The screws 32 for securing said plates 15 to the plates 2 preferably pass through the extension 16 and by reason of said extension 16 fitting into the recess in the plate 17 only one screw is needed and the parts will be held rigidly in position. Said plate 15 is provided with suitable holes 18 for the mounting of the series of registers 19, 20 and 21. These registers may be made in any suitable manner as I claim no invention in them as shown herein; in fact what is here shown is an old and well known form commonly styled the "Geneva" wheel. Each register has an indicating wheel having on its face numerals from zero up to nine, as appears in my prior Patent No. 585,742. Said indicating numerals are disclosed through suitable openings 22 in the plates 23, to be found in Fig. 1.

The unit register is driven through the wheel 24 to be seen in Figs. 15 and 16 by means of the sliding pawl or plate 25 having at one end a pin 26 that extends through the slot 27 in the plate 15, shown in dotted lines in Figs. 15 and 16 and in plain lines in Fig. 1. In this manner the reciprocating movement of the sliding pawl 25 is limited to suit the registering wheel 24. On the lower side of the sliding pawl 25 a pair of ratchet teeth 28 are provided to engage the teeth of the registering wheel 24. To limit the movement of the registering wheel 24 I provide a double armed check pawl, or an escapement 29 pivotally mounted on the face of the plate 15. One of said arms is provided with a hook 30 to engage the inclined face of the teeth on the wheel 24 to bring the end 31 of said pawl into engagement with one of the teeth of the wheel 24 to prevent its backward movement. The advantage of this pawl arrangement over a spring to prevent the backward movement of the wheel 24 is first that it does not create nearly so much friction against the wheels 24 so that said wheels are movable with less power or exertion and since, as will hereafter appear, a number of these registers are simultaneously actuated by the opening of the door of the booth as a voter leaves it it is desirable to prevent the friction that would result from so large a number of springs bearing against the wheels 24. In the second place the action of this pawl is always positive and certain. And this is of most vital consequence because it contributes much to the accuracy of the machine in registering the vote as cast.

After the sliding pawl 25 has been actuated whereby the registering wheel 24 is turned one notch, said sliding pawl is returned from the position shown in Fig. 15 to that shown in Fig. 16 by the pivotal arm 33 secured to the pin 34 that extends through the plate 17. To hold each vertical series of said pivotal arms 33 and the sliding pawls and locking bars 90 in position, I place upon the same the plate 35 and in front of the plate 35 I mount the plate 36 which is held apart from said plate 35 by the spacers 37 and is secured by the screws 38 that extend through said plate 36, the spacers 37, the plate 35 and the plate 17 and screw into the plate 2, whereby all of said plates and intermediate mechanism are held securely in place. The keys 40 are pivotally mounted on the outer face of the plate 36 and are provided with a short arm 41 and the knob 42 to enable the voter to actuate said key. From said key 40 a pin 43 extends through the slot 44 in the plate 36 and through a suitable notch 45 in the plate 35 and engages the pivotal arm 33 on the under side of the rear projection of said arm and to one side of the pivotal point of said arm. From this it is seen that the operation of the key would continue to elevate the rear projection of said pivotal arm 33 and thereby rotate said arm to the left as shown in Fig. 15 which will cause the arm to move the sliding pawl 25 from the position shown in Fig. 15 to that shown in Fig. 16. The lower edge of the upper portion of said pivotal arm 33 is inclined upward somewhat in a direction away from its pivotal point in all positions of said arm in order to permit the upward movement of the key pin 43 to always readily moved upward and thereby actuate the arm 33. When said arm 33 is thrown back from the position shown in Fig. 15 to that shown in Figs. 16 and 17 it falls against and rests upon said key pin 43 as appears in Fig. 10. Said pivotal arm 33 is so formed and pivoted that specific gravity will positively hold it in either its operated or unoperated position. Therefore said arm is so mounted that it passes its center of gravity in moving from the unoperated to the operated position as shown respectively in Figs. 15 and 16. As appears in Fig. 15 the upper portion and rear projection are heavier and more than balance the curved extension on the other side of the vertical line through the pivotal center, and on the other hand, as appears in Fig. 16, the left hand extension of the upper part and also the lower part outweigh the rear extension and thereby hold the arm positively in the position shown in said figure. This latter is of importance for otherwise the same voter could vote for another candidate for the same office as will hereafter be explained. With the construction herein shown that is impossible.

The ballots are held in a vertically movable holder formed of a plate 50 with tongues 51 punched out of the same to leave openings and turn backward and upward to form a receptacle for a ballot containing the name of the candidate and the office he is seeking. Said plate has on its inner face along each side vertical guides 53 secured thereto which rest against the plates 36 and thereby hold the ballot holder from lateral movement and enable the same to be vertically moved between said plates 36. Said ballot holder is prevented from backward movement while in place by the plate 50 overlapping the edges of the adjacent plate 36 and is prevented from any forward movement by the pins 54 projecting laterally from the guides 53 immediately behind the edges of said plates 36. The edges of the plates 36 are provided with a series of notches 55, as appears in Fig. 1, corresponding with the pins 54 when the ballot holder is in the lowest position possible. It is therefore plain that by lowering the ballot holder sufficiently it can be moved forward, said pins 54 passing through the notches 55, and thereby be removed from the machine if desired.

The upturned tongues 51 extend sufficiently high that when said ballot holder is in its uppermost position said tongues will conceal the indicating numerals that otherwise would show through the holes 22 in the plates 23. It is desired to hold the ballot in its uppermost position while the voting is in progress. A rock shaft 58 is mounted horizontally through the plates 5, as appears in Figs. 2, 3, 5, 7 and 9. The ballot holder 50 is normally held in its uppermost position by the pin 57 which engages the cross bar 63 secured to the guides 53 carrying the ballot holder 50, as seen in Fig. 7. Extending in line with 57 is the pin 59 so that when 57 is at its upper limit 59 is at its lower limit in which position it is held when the screw 60 is turned down till they contact and any interference is prevented by the door 61 which is closed and locked by two different locks. To lower the ballot holder and reveal the count, the door is opened, the screw 60 is turned up to the position shown in Fig. 7 and the rock shaft is rotated by a removable lever inserted in the hole 62.

In order to prevent the accidental operation of any of the keys 42 by the coat sleeve or other means I provide a guard rail 64 extending vertically between the row of key knobs 42 when in their unoperated position. The guard rail is secured to the ballot holder or plate 50, as appears in Figs. 6 and 7 by means of the spacers 65 riveted to said guard rail and ballot holder. There is one key 40 provided for each candidate, as appears in Fig. 1. The action of said key when operated upon the pivotal arm 33 has been explained. Said key is so mounted that in its operation it passes over a vertical line through its pivotal center so that gravity tends to hold it in either its operated or unoperated position so that, being held in its operated position the voter can clearly observe which keys he has operated which is a matter of importance to the voter.

Means for voting a straight ticket is also provided in this machine. To that end a straight ticket bar 70 is mounted vertically slidable on the plate 35 between the guides 38. Said bar is moved vertically by the straight ticket key 75 whose rounded end is centrally pivoted in the plate 36 and away from its center has the inwardly extending pin 76, shown in Figs. 9 and 10, that extends into the straight ticket bar 70. Said straight ticket keys 75 are preferably made in the same shape as the key 40 but the arm portion 41 is preferably longer to provide greater leverage, inasmuch as the straight ticket bar must actuate all of the keys provided for the individual candidates in the whole straight ticket. As seen in Figs. 1 and 10, the bar 70 is provided with notches 71 in its edge through which the pin 43 from the keys 40 extend. It is obvious therefore that when the straight ticket key 75 is operated by depressing the end 42 thereof it will elevate the straight ticket bar 70 and the notches 71, as shown in Fig. 10, will elevate and operate every individual key 40 in the series and therefore will operate all of the pivotal arms 33 in the series simultaneously.

Having explained the framework ballot holders, keys, registering mechanism and the means for setting the sliding pawls 25 for the ticket or candidate for whom the voter desires to cast a vote, I now proceed to explain the means for actuating said registers through said sliding pawls. A gridiron frame is mounted to be laterally slidable between the plates 15 and 4, which are held apart by the upright plates 1 and 2. It appears in Figs. 2 and 3 and is composed of a series of horizontal bars 80 and vertical bars 81. The bars 80 are provided with longitudinal slots 82 through which pins 83 extend which are secured to the plates 2, and thereby the said grid-iron frame is guided in its lateral movement. Said gridiron is moved laterally from the position shown in Fig. 2 to the position shown in Fig. 3 by means operated by the entrance door or lever operated before voting that will hereafter be explained and it is reversed by means operated by the exit door or lever operated after voting. The pin 26 secured to the sliding pawl 25 and extending through a slot in the plate 15, as appears in Figs. 16 and 1, is provided with a head, as shown in Figs. 2 and 3 which is engaged by the vertical plate 81 of the grid iron frame and moved from the position shown in Fig. 16 to the position shown in Fig. 15 and that movement causes the sliding pawl 25 to actuate the registering wheel 24. It is observed therefore that in this machine the operation of the key or keys by the voter does not actuate the registers but pushes back the sliding pawls 25 into position to operate the registers for all the candidates being voted for. Then as the voter leaves the booth the opening of the door, through the grid iron frame, actuates all the sliding pawls 25 which the voter has put in position and thereby simultaneously actuates all the registers for all the candidates for whom he is voting.

The locking mechanism will be understood from the following description: A series of sectional locking bars 90 are placed end to end horizontally between the plates 15 and on the same plane; in fact they occupy, in the machine here shown all the space between the plates 15 but are so mounted as to be readily movable laterally. There is therefore one sectional locking bar 90 above each plate 15 for the mechanism mounted on such plate. At one end of said locking bar a pin 91 is provided that is engaged by the head of the pivotal arm 33 when it is actuated whereby said locking bar is moved laterally from the position shown in Fig. 15 to that shown in Fig. 16. The limit of movement of said locking bar is fixed by the limit of movement of the movable frame. It is observed that when one of these sectional locking bars is thus operated it will operate or push to the left all the other sections to the left of it but will not move those sections to the right of it. A stop lug 94 is placed on every sectional locking bar of each series excepting the one to the left. Said lug is near the left end of each locking bar on which it is placed, as shown in Figs. 15, 16 and 17, in such position that it will not engage the upper surface of the rear extension of the pivotal arm 33 in its unoperated position, as shown in Fig. 15, in case the locking bar to the left be operated and also in such position as to pass far enough over the surface of said rear extension of the pivotal arm as to prohibit the operation of said pivotal arm after the locking bar to the left has been operated, as appears in Fig. 17. From this description it is observed that when a key has been operated all of the sectional locking bars and pivotal arms to the left of the operated key will be in the position shown in Fig. 17 and therefore none of such arms can be operated because of the lug 94 that stops the upward movement of the rear extension of the arm 33 and the locking bar to the right of the operated key will be in the position with relation to the pivotal arm 33 that is shown in Fig. 16 so that said locking bar to the right can not be operated because the lug 94 engages the rear upward surface of the rear extension of said arm 33, and, since the first section to the right can not be operated, none of the other locking bars to the right can be moved as they all abut against each other. Therefore, it is observed that when one key in a cross row has been operated no other key in the cross row can be operated and no other candidate for the same office be voted for.

The locking bars are all reset simultaneously by the movement of the grid iron frame, that is the vertical bars 81 in their lateral movement engage the pins 95 that extend rearward from the locking bars, as appears in Figs. 2 and 3. Therefore said locking bars are returned to their unoperated position at the same time that the sliding pawls 25 are actuated and the pivotal arms 33 and the voting keys are returned to their unoperated position. While the sliding pawls 25 may be used to return the pivotal arms 33 and voting keys to their unoperated position, still in the machine herein shown I depend upon the locking bars to perform this work. Therefore, as shown in Fig. 15 the construction is such that the final return movement of the pivotal arm 33 is effected only by the locking bar and sliding pawl 25 being out of contact with said pivotal arm. While said pivotal arm is in its unoperated position I desire to leave space between it and the end of the sliding pawl 25 in order that any jarring of the key will not cause the pivotal arm 33 to strike the sliding pawl 25 and give it any movement. Such movement of the pivotal arm 33 is prevented by the contact of the pin 91 on the locking bar 90 against the head of the pivotal arm 33, or by the contact of its rear extension with the stop 94.

The grid iron frame is returned by means operated by the entrance door when it is opened, and that will now be described. The mounting of the voting machine proper in the booth will appear in Fig. 13. There is shown a jamb 100 on each side with a tie bar 101 at the top and a cross piece 102 which is preferably placed about three feet from the floor or bottom of the booth. The jambs 100 are constructed in cross section as shown in Fig. 4 with opposing vertical recesses 103 in which the sides of the voting machine proper fit snugly so that the voting machine rests upon the cross bars 102. It may be secured to the booth in any desired manner. To one jamb there is hinged the entrance door 104 and to the other is hinged the exit door 105. Said doors are provided with straps 106 preferably one at each end provided with eyes at their free ends to fit over and be rigidly secured to the vertical rods 107 that extend through said jambs from top to bottom so as to be rotatable. On said rods 107 I secure arms or arm collars 108 to the outer portion of which I pivot push rods 109 that extend through suitable slots in the side plates 10 of the voting machine proper and their inner end engages the side of the grid iron frame so that when said push rods are pushed or operated by the opening of the doors they will move said grid iron frame laterally. When the entrance door 104 is open the push rod 109 which it operates engages the side of the independent ballot receptacle 135 which is secured to the left side of the grid iron frame as shown in Figs. 2 and 3 and which will be hereafter explained and moves said grid iron frame from the position shown in Fig. 3 to the position shown in Fig. 2. This unlocks the voting mechanism. On the other hand when the door 105 is opened as the voter leaves the booth, the rods 109 push against the upturned end of the cross bars 80 of the grid iron frame and move said frame from the position shown in Fig. 2 to that shown in Fig. 3. This lateral movement operates the registers and returns the locking bars, pivotal arms and voting keys to normal and locks the voting mechanism.

To prevent the entrance door from being opened while the exit door is open that no voter may come in at the entrance door until after the preceding voter has gone out of the booth and the exit door is closed, I provide a latch bar 115 mounted on the pivot 116 that is secured to the front wall 117 of the voting booth, that is the wall behind the voter while he is voting. A suitable latch 118 is provided at one end to said latch bar 115 that engages a suitable shaped plate 119 which is secured to the entrance door near the top. The end of the latch bar that holds the entrance door is heavier than the other end thereof so that gravity will actuate said latch bar. Said latch bar is held out of engagement with the entrance door by means of the tongue 220 that is secured to the exit door and which engages and rides upon the inclined end 121 of the latch bar as said exit door is closed whereby the end of the latch bar adjacent to said door is depressed. This elevates the end on which the catch 118 is placed and releases the entrance door. From this it is seen that when a voter leaves the booth and opens the exit door thus disengaging the inclined end 221 of the latch bar gravity will cause the other end to engage and hold the entrance door secure against the admission of any voter until the exit door is closed and brought again into the position shown in Fig. 13. It is preferable that said door also be held closed by a spring 215 or other means commonly used for holding doors shut, and it is preferable that the entrance door have no knob 216 on the inner side and the exit door have no knob on the outer side so that the voter cannot return.

The arrangement of the arm collar 108 and the push rods 109 is such that the grid iron frame will be fully actuated by the time the door is one-fourth open sufficiently to permit a man to pass through. By reason of the push rods 109 being disconnected with the grid iron frame the further movement of the door or any oscillation or swinging of the door will have no effect.

The number of voters is registered by the opening of the entrance door which shifts the grid iron frame from the position shown in Fig. 3 to the position shown in Fig. 2 and by placing on one of the bars 80 of said frame a post 120 that extends to the back of the plate 9 of the machine. On the inside of said back plate I mount a register of the same nature as the registering mechanism for the single candidates or straight tickets and said registering mechanism is actuated by the sliding pawl 25 in the same manner as the other registering mechanisms. The pin 26 secured to the sliding pawl 25 extends into a recess or hole in the post 120. Therefore when the grid iron frame is moved in either direction it through the post 120 moves the sliding pawl to and fro and in this manner actuates the wheel 24 and the rest of the registering mechanism. To disclose the indicating numerals on the indicating wheels of the registering mechanism I provide three apertures 121 in the back plate 9 whereby the total number of voters that have entered the booth will be disclosed to the election officers and there is no means for concealing such registration.

In order to indicate to those outside whether a voter is in the booth or not I provide a finger 122 or other index which is secured to a shaft 123 extending through the back plate 9 and having on its inner end a yoke 124 that is placed astride the post 120. Consequently when the entrance door is opened said index is oscillated one way and when the exit door is opened it is oscillated the opposite way. The position to which it moves is respectively indicated by the words "In" and "Out" or other means.

While I have already explained means in this machine for indicating to the election officers and other persons the number of voters who have voted, I also provide means for indicating the number who have voted to persons outside the voting room, say at the headquarters of political parties. To accomplish that I provide the rod 125 that is connected with the grid iron frame or other means operated in locking or unlocking the machine that extend out of the machine into actuating engagement with any suitable means for operating the registers, counters, signals or other indicating means at any desired distance. I here show said rod 125 and its connections as operating a register 126 similar to the other registering mechanisms shown. Any telegraphic or mechanical means heretofore employed would suffice to indicate at the other end every movement of the grid iron frame or other means operated in locking and unlocking the machine. This not only indicates to outsiders the total number of voters but it discloses to them every movement of the machine so that no votes can be unlawfully cast or the machine be tampered with without the knowledge of the watchers on the outside. Of course such means for conveying information from the machine to outside parties should be concealed from or rendered inaccessible to the parties within the room where the voting is being conducted. It is obvious that any similar connection with the entrance door or any other means that is to be operated to record a vote or put the machine in condition for recording a vote will suffice. Means are also provided in this machine for permitting a ballot to be cast for candidates not on the regular tickets. As observed in Fig. 1 at the right hand end of the machine there is a wide face plate 36 and adjacent to it and superimposed upon its edge the ballot holder plate 50. By means of these plates and the parts attached thereto the irregular voting is accomplished. The ballot holder 50 adjacent to the end plate 36 is formed and arranged the same as the other ballot holders and behind it the same kind of registers are provided and in it the same kind of tickets except that the name of the candidate is blank. The name of the office is shown and opposite to each of the openings in said ballot holder there is a corresponding key 130 mounted on the plate 36 with the lever portion 41 extending, when in normal position, horizontally to the right and covering and concealing the horizontally extended slot 131. When a person desires to vote for a candidate for a certain office not on any of the regular tickets he first operates the key 130 by turning it upward somewhat, as shown in Fig. 1, thus uncovering said slot and introduces a card ballot through the slot. When the key is operated as suggested it actuates the sliding pawl 25 and the locking bar in the same way that the other keys do as heretofore described, thus counting one in the register and locking the machine so that he can not vote for any other candidate for the same office. For this purpose stiff card board ballots 132 are provided as indicated in Fig. 8. As shown in said figure, behind the plate 36 the end of the plate 2 is also provided with slots 133 which are so narrow as to permit the passage through them of only one ballot. The guides 134 are provided for the card in its passage from the slot 131 to the slot 133, each set of slots having a guide above and a guide below that flare outward. The top side of one of these guides is shown in Fig. 6, said guide being formed of a plate secured to the plate 2 and having its ends bent to form the guides. As seen in Fig. 6 a ticket receptacle is provided for these ballots consisting of the side plates 135 with the inclined slats 136 to be seen in Fig. 8 secured between them making a rigid construction that is secured to the backturned ends 137 of the bars 80 forming a part of the grid iron frame. This receptacle is immediately behind the plate 2 and extends farther to the right than the plate 2, as appears in Fig. 6 when the ballot is cast and before the voter has left the booth. The length of the card board ticket 132 and the width of the chamber into which it extends as shown in Fig. 8 should be such that said ticket can not be pushed through the slot 133 so as to escape downward, thus preventing the introduction of a second ticket.

As seen in Fig. 8 the ticket before it can be pushed in far enough to drop would engage the back plate 9 which would stop its further movement so far as the voter is concerned. When the ticket is in the position shown in Fig. 8, the parts are in the position shown in Fig. 6, as the voter leaves the booth and opens the exit door the grid iron frame is moved to the right, as shown in Fig. 6 which causes the ticket receptacle 135 to be also moved to the right. When it is moved to its limit in that direction, the inner wall 135 is flush with the right hand edge of the plate 2 and also with the guides 134 and therefore the ticket is released and drops. Such movement of the grid iron frame will also return the voting key 130 to its normal position whereby it covers the slot 131 and records the vote. In this part of the machine I also provide a straight ticket key at the top so that a ballot containing the whole ticket one wishes to vote may be inserted in the manner heretofore described and when it is thus voted the rest of the mechanism is locked to prevent voting other tickets or for any individual candidate. This locking is caused by one of the keys 130 and its corresponding pivotal arm 33 actuating the locking bar 140 which is like the sectional locking bar 90 excepting that it extends entirely through the machine, as appears in Figs. 2 and 3, where the back of it is shown. This locking bar 140 is independent of the locking bars for the other straight ticket keys. Said locking bar 140 is connected by a bell crank 141 with the vertically sliding locking bar 142, as shown in Fig. 12. When it is in the position shown in Fig. 12, that is elevated, it prevents the operation of all the locking bars 90 so that no other straight ticket key and no individual ticket key can be operated and no other independent ballot voted because it engages the screws 144 on the locking bars 90. When the locking bar 140 is not operated it and the bell crank 141 are in the position shown in Figs. 2, 3 and 11; and then the vertical locking bar 142, being forced downward from the position shown in Fig. 12, the notches 143 therein permit the movement of the screws 144 and the locking bars 90. I have also provided means for the accommodation of limited voters by which I mean persons who are permitted to vote for some of the candidates or tickets. When a limited voter wishes to vote during the progress of the voting the election officer before such voter enters the booth operates the limited voter key 145 on the back, as seen in Fig. 5. That key is pivoted to the back 9 and has secured to it an inwardly extending pin 146 that operates through the segmental slot 147 in the back 9 which extends into the oblong hole 148 in the vertically sliding bar 149, as seen in Figs. 2, 3, 11 and 12. The knob of the key 145 is depressed in operating the key and therefore its operation elevates said bar 149 from the position shown in Figs. 2, 3 and 12 to the position shown in Fig. 11. When said bar 149 is in the unoperated position shown in Fig. 2 it does not interfere with the operation of the locking bars 90, as the screw heads 144 can readily enter the notches 150 in said bar.

When said bar is operated and elevated as seen in Fig. 1, it engages the screw heads 144 on the locking bars 90 and prevents the operation of the locking bars, excepting some of them as hereinafter described. If the limited voter is entitled to vote for a certain office the screws 144 on the locking bar controlling the voting for candidates for that office are removed and replaced by other screws similar excepting they have shorter heads so that they will not be engaged by the bar 149 when elevated or operated as in Fig. 11. The machine is prepared for this before each election by inserting the shorter screws 144 instead of the longer ones in the locking bars for the offices that the limited voter is entitled to operate. To prevent the return of the bar 149 when elevated by the election officers as above explained, I provide a catch bar 152 which is pivotally mounted to one of the cross bars 4 so as to depend therefrom. It has a finger 153 extending against the edge of the bar 149 as seen in Fig. 2. When the bar 149 is depressed, as in that figure, the catch bar 152 is pushed away somewhat from the position it would occupy if swinging free but when said bar 149 is elevated, the weight of the bar 152 swings the finger 153 over into one of the notches 150 of the bar 149 and holds said bar up. This engaging position of the finger 153 is shown in Fig. 14. When the limited voter leaves the booth and operates the grid iron frame by the means heretofore described, the pin 155 engages the catch bar 152 and pushes it out of engagement with the notch 150, as appears in Fig. 3, and then the bar 149 drops to its unoperated position.

In order to positively require the bar 149 to move down, I place on one of the cross bars 80 of the grid iron frame the pin 156 that engages the surface of a notch 157 in the bar 149 as will be clear from an examination of Figs. 2 and 3. It is obvious, as shown in Fig. 2 that if the bar 149 is up and the grid iron frame moved to the left the pin 156 will engage the inclined surface of the notch 157 and force the frame down. When the bar 149 is not operated the pin 156 will move without obstruction into and out of the notch 157, as shown in Fig. 3, whenever the grid iron frame is operated. The return of the bar 149 by the means described to its normal position will cause the key 145 on the back side, as shown in Fig. 5, to be returned to normal. It is thus observed that the machine automatically returns to its normal position after the limited voter has voted and this change is not dependent upon the election officer.

This machine is also provided with means for multiple voting. This is regulated by what is called a repeater, shown at the left hand of Fig. 1 and in detail in Figs. 18 to 23. The repeater is mounted on plate 1 any-where so that it is adjacent to the locking bars for the group of offices for which multiple voting is authorized. For that purpose said plate 1 is provided with a series of horizontal slots 160 through which pins 161 secured to the base plate 162 of the repeater extend and reciprocate horizontally. There is a pair of these pins for each slot in order to hold the repeater steady. The base plate 162 of the repeater is provided with a series of transverse notches or recesses that register with and receive the pins 164 on the end of the locking bars 90. On the face of said base plate 162 I pivot levers 165 one end of which abuts against a stationary vertical bar 167 secured to the plate 1. Said levers 165 have at their other end a pin 168 extending through slots 169 in the unlocking plate 170. Said slots 169 are vertical and when the plate 170 is in normal position, as shown in Fig. 18, the pins 168 are in the upper ends of the slot.

The repeater is operated by a centrally pivoted key 171 having a pin 176 extending through a slot 44 in the face plate 36 and which bears against the plate 170 so that when said key is operated it pushes said plate 170 to the right from the position shown in Fig. 18, into the position shown in Fig. 19, and this operation causes the whole repeater to move over into the position shown in Fig. 19 by the lever 165 bearing against the bar 167. When the repeater is moved to the right, into the position shown in Fig. 19, the locking bar 90 by the operation of the voting key causes the pin 164 on the end of the locking bar to enter the notch 163 and engage the inclined edge of the locking block 172 and force said block upward thus closing all notches 163 above so that no locking bar pins 164 can enter any of the notches 163 above and the locking bar which has thus penetrated the notch 163 holds all the locking blocks below down so as to close the notches 163 below against the entrance of any other locking bar pin. Thus the operation of one locking bar will prevent the operation of any other.

After the voter has moved the repeater into the position shown in Fig. 19 and before he votes, in other words as soon as he releases the key that throws the repeater over, the spring 175 acting on the levers 165 draws the plate 170 back into the position shown in Fig. 18 but it does not draw the repeater back. After he has voted for one candidate he can operate the key 171 which throws the plate 170 over into the position shown in Fig. 19 and that plate engages the pin 164 of the operated locking bar and pushes said locking bar back into normal position. This permits the blocks 172 to return to the normal position and the spring 175 draws back the plate 170. He can then vote again and the same operation is repeated.

In order to limit the number of votes that can be cast by one voter in this manner, I mount as seen in Fig. 22, a short shaft 180 in the base plate 162 of the repeater. It has on it the disk 181 with the finger 182 and on the side of the disk 181 I mount a coiled spring 184 whose inner end is secured to the shaft 180 and whose outer end is secured to the base plate 162. The purpose of this spring is to return the disk 181 to its normal position when the voter leaves the booth. On said shaft 180 I also mount the ratchet wheel 183, to be seen in Fig. 18, that is engaged and operated by the gravity pawl 185 which is pivoted to the plate 170 by the pivot 186 and is actuated by said plate. Said pawl has a downwardly extending end 187 that rides upon one end of a short lever 188 that is pivoted to the plate 162 at 189. At the other end of said lever 188 I provide a hook to engage the ratchet teeth in the wheel 183. The pin 190 in the plate 1 limits the movement of the lever 188 and engages the inclined lower surface thereof in such manner that when the repeater is moved into operated position the end of the lever 188 that carries the arm 187 and the pawl 185 will be lowered, thus letting the pawl into actuating engagement with the ratchet wheel 183 and also letting the catch end of the lever 188 engage the ratchet teeth, all of which appears in Fig. 19. It will thus be plain that the catch on the lever 188 will hold the ratchet wheel 183 from a reverse movement during all the operation of the device by the voter, and while the repeater is in the operated position, as shown in Fig. 19. During that time the lever 188 is stationary but the pawl 185 is left free to be moved by the plate 170 every time the latter is actuated by the voter. When the voter leaves the booth the repeater is returned to its unoperated position. The end of the lever 188 rides up on the pin 190 thus releasing the catch on said lever from the ratchet wheel 183 and also elevating the pawl 185 out of engagement with the ratchet wheel.

In the plate 162 a series of holes 191 are provided to receive a pin 192 that serves as an adjustable stop to limit the forward movement of the disk 181 by engaging the finger 182. There is one of these holes 191 for each tooth of the ratchet wheel 183 so that by setting the pin 192, one limits the number of ballots a voter may cast by means of the repeater. The pin 193 is a stationary stop to limit the back movement of the disk 181. On the same shaft 180 and against the ratchet wheel 183 I secure the indicating wheel 194 whose numerals are disclosed through a suitable opening in the front plate 36, as is shown in Fig. 1. This will indicate to the voter the number of times he has voted for the single office. It is therefore plain that with this mechanism he can vote until the finger 182 engages the pin 192 and stops any further operation of the repeater or any further multiple voting. I might add that the locking blocks 172 are preferably made as shown in Fig. 21 with L shaped slots 195 to slip loosely over the pin 196 that is secured to the plate 162. This permits the easy placing of said blocks and their vertical movement and removal if desired.

To prevent a voter operating the repeater after he has voted for any of the candidates in the multiple ticket, the following mechanism is provided: Such previous voting for any candidated on the multiple ticket will cause the locking bar 90 next to the repeater to be moved into the operated position which will bring the pin 95 to pass above the lateral projection 208 on the vertically sliding plate 203 as shown in Figs. 2 and 3, and thus prevent the vertical movement of said plate. This plate 203 has slots 204 in it through which guide pins 205 from the bars 4 of the main frame extend. It has also a lever 201 pivoted at one end to it which is centrally pivoted by the pin 202 to the plate 1. The free end of the lever 201 has an inclined face that is engaged by a pin 200 secured to the plate 162 of the repeater and extending through the slot 160. It is therefore clear that after one of the locking bars 90 has been operated the repeater can not be moved into position for use. On the other hand, if no locking bar adjacent to the repeater has been operated the repeater can be thrown over and when that is done through the mechanism just described, the plate 203 can be elevated so that the projections 208 will be above the pins 95 on the locking bars. Then the multiple voting can be proceeded with.

When the repeater is thrown over by the key 171 it is held in such position for the time being by the hooks 207 that are pivoted to the plate 1, as shown in Figs. 2 and 3, which engage the pins 161 that are secured to the plate 162 and extend through the slots 160. This holds the repeater into close actuating connection with the rest of the voting machine. Said hooks 207 are disengaged from the pins 161 by the movement of the grid iron frame as the voter opens the exit door in leaving the booth. Said hooks rest upon pins 209 in a plate 210 pivotally connected to a pair of levers 211 that are centrally pivoted to the plate 1 and are at their other ends pivoted to the plates 80 of the grid iron frame. When the grid iron frame is moved to the left, as shown in Figs. 2 and 3, it actuates said levers 211 which move the plate 210 in the opposite direction, that is, to the right as appears in Fig. 3. Such movement of said plate 210 causes the pins 209 to engage a projecting surface on the under side of the catches 207 and lift them up out of engagement with the pins 161 and the plate 162. This releases the repeater and then the further movement of the plate 210 by the remaining movement of the grid iron frame engages and forces the pins 161 to the right, as shown in Figs. 2 and 3, which throw back the repeater into its normal position, as shown in Fig. 18. This completes the operation of the repeater and places it in position for the next voter.

In this machine two repeaters are shown. Where cumulative voting for the candidates for the same office is lawful, a lug 92 on the face side of the locking bar 90 will actuate the sliding pawl 25, thus registering a vote every time the unlocking key 171 of the repeater is actuated. In other words, by this means the register is actuated by the repeater through the locking bar. The locking bar is actuated as we have already seen by the engagement with it of the unlocking plate 170 engaging it and pushing it over whenever said plate is actuated by the unlocking key 171. The lug 92 does not interefere with the operation of the locking bar or the sliding pawl that has heretofore been described when the repeater is not in use nor does it do so when the repeater is in use. In other words this lug 92 is merely to do the work temporarily while voting the multiple ticket. The grid iron frame does it at other times. Attention is also called to the fact that by reason of the means employed whereby the grid iron frame is actuated through the opening of the doors of the booth, whereby the doors actuate only when moved one way election officers may enter the entrance door of the booth to assist or arrest a voter, as the law might provide, without affecting the register of his vote, or on the other hand, said officers may enter the exit door when no voter is in the booth, without affecting the locking condition of the machine. The plates 23 through which the indicating numerals are revealed are preferably made in sections corresponding to plates 15, and are held in position by the shouldered pins 47 which are secured to the plates 15 through the holes 18, by means of the nuts 48 on the free ends of the pins.

To prevent the operation of the means for the disclosure of the figures on the indicating wheels, I attach to the bar 80 of the movable frame a plate 66 which covers the hole in the rock shaft 58 for the rod 62 while the booth is occupied for the purpose of voting and thus prevents the insertion of the rods 62. This appears in Figs. 5 and 7.

In the operation of my actuating and resetting mechanisms, I do not wish to limit my invention to the use of a booth or booth doors, as those terms are often understood. For the purpose of my machine, any means that is moved by the voter as he takes position to vote and as he leaves such position, will perform all the mechanical functions that are performed by the entrance and exit doors, as herein set forth. Such doors or mechanical equivalents, are in such connection parts of the voting machine as distinguished from the booth or means for secreting the voter from the observation of others.

In the booth and machine herein shown the entrance and exit doors of the booth are levers in their mechanical connection and operation with the voting machine proper.

What I claim as my invention and desire to secure by Letters Patent, is:—

1. In a voting machine, registering mechanisms, movable pawls disconnected from said registering mechanisms and normally out of position to actuate the same and having forward and return movements and adapted to actuate the registering mechanisms during the return movement to normal position, means for moving said pawls into the register actuating position, and means for giving them return movement.

2. In a voting machine, stationary registering mechanisms, pawls normally out of position to actuate the registering mechanisms when moved, means for moving the pawls from their normal position to an actuating position, and means for moving them from the actuating position back to their normal position, a part of the registering mechanism being in the path of the pawls in the latter movement whereby the pawls will actuate the registering mechanisms.

3. In a voting machine, stationary registering mechanisms, horizontally slidable pawls adapted to actuate the registering mechanisms when in an actuating position, and a horizontally movable frame for moving all of the pawls that are in an actuating position, whereby they will actuate their corresponding registering mechanisms.

4. In a voting machine, stationary registering wheels, pawls for actuating the same, said pawls and registering wheels being in the same plane, voting keys movable in a plane parallel with the planes of said pawls and registering wheels for moving the pawls to a position to actuate the registering wheels, and a frame movable in a plane parallel to the planes of said pawls and registering wheels for moving the pawls into actuating engagement with said wheels.

5. In a voting machine, a lever operated after voting, registering mechanisms, pawls to actuate the same, means disconnected from said pawls for placing the pawls in position to actuate the registering mechanisms but without actuating them, and a common means disconnected from the means for moving the same and operated by said lever for actuating said pawls when in an actuating position and movable in the same direction.

6. In a voting machine, a lever operated before voting, another lever operated after voting, a registering mechanism and a pawl for actuating it for each candidate or ticket arranged in rows or series, an edgewise movable frame disconnected from the means for moving the same and having a series of bars, one for each row or series of pawls and adapted when moved to actuate every pawl that is in position to actuate the registering mechanisms, means actuated by the lever operated after voting for moving said movable frame to actuate the registering mechanisms, and means actuated by the lever operated before voting for returning said movable frame to its normal position.

7. In a voting machine, stationary registering mechanisms for all the candidates on one ticket, pawls which are normally not in position to actuate directly such registering mechanisms, a common means movable in the same direction as the pawls for placing the pawls in position to actuate the corresponding registering mechanisms, and a different common means for actuating said pawls after being so placed.

8. In a voting machine, a lever operated before voting, a lever operated after voting, disconnected means operated by the lever operated after voting for locking the parts of the machine after operation, and means disconnected from the means for moving the same and operated by the lever operated before voting for unlocking the machine.

9. In a voting machine, a lever operated before voting, a lever operated after voting, registering mechanisms, locking mechanisms, an edgewise movable frame disconnected from the means for moving the same and actuated by the lever operated after voting to operate the registers and return the locking mechanisms to normal and hold the parts of the machine from further operation, and means actuated by the lever operated before voting for moving said frame in the opposite direction to permit the operation of the machine by the voter.

10. In a voting machine, a registering mechanism, a sliding pawl normally out of position to actuate the register mechanism when moved, a key for moving said pawl in position to actuate the registering mechanisms, means disconnected from said pawl for actuating said pawl when in such position, and means actuated by said key for preventing the actuation of other registering mechanisms.

11. In a voting machine, a plate, a stationary registering mechanism mounted thereon, a pawl slidably mounted on said plate normally out of position to actuate the registering mechanism when moved, means for limiting the movement of said pawl, a key for moving said pawl into position to actuate the registering mechanisms, independent means for actuating said pawl when in such position, and means actuated by said key for preventing the actuation of other registering mechanisms.

12. In a voting machine, a registering mechanism, a sliding pawl normally out of position to actuate the registering mechanism when moved, a pivotal arm that engages said pawl and moves it into position to actuate the registering mechanism, a key for moving said pivotal arm, means for returning the pawl so it will actuate the registering mechanism, and means actuated by said key for preventing the actuation of other registering mechanisms.

13. In a voting machine, a series of registering mechanisms one for each candidate or ticket, a sliding pawl for each of said registering mechanisms that is normally out of position to actuate the registering mechanism when moved, a key for moving each of said pawls into position to actuate the registers, means movable in the same direction as and engaging all of said pawls to return them simultaneously for actuating the registering mechanisms, and means actuated by said key for preventing the actuation of other registering mechanisms.

14. In a voting machine, a registering mechanism, a sliding pawl for actuating the same that is normally out of position to actuate the registering mechanism when moved, a locking-bar slidable parallel with the pawl, a key for moving the pawl into position to actuate the register and simultaneously moving the locking bar in the same direction, and a common means for simultaneously returning the pawl and locking bar so as to actuate the registering mechanism and interlocking other parts.

15. In a voting machine, a registering mechanism, a sliding pawl for actuating it that is normally out of position to actuate the registering mechanism when moved, a locking-bar slidable parallel with the pawl, a pivotal arm adapted to engage and move said pawl into position to actuate the registering mechanism and simultaneously move the said locking bar in the same direction, a key to actuate the pivotal arm, and a common means for returning said pawl for actuating the registering mechanism and simultaneously returning the locking bar to interlock other parts.

16. In a voting machine, a series of registering mechanisms, one for each candidate, a sliding pawl for actuating each register that is normally out of position to actuate the registering mechanism when moved, a locking-bar for each candidate slidable parallel with the pawl, a key for each candidate that moves said sliding pawl into a position to actuate the registering mechanisms and moves the locking bar in the same direction, and an edgewise movable frame independently mounted that engages all the sliding pawls and locking-bars and moves them in the opposite direction to actuate the registering mechanisms and lock the same from further operation.

17. In a voting machine, a registering mechanism, a sliding pawl for actuating it, a slidably mounted locking-bar, a pivoted arm that engages and moves said pawl into a position to actuate the registering mechanism and simultaneously moves the locking-bar in the same direction, means for moving them simultaneously in the opposite direction, and means for limiting the return movement of said sliding pawl and locking-bar so that the pivotal arm will engage the locking-bar before it will engage the sliding pawl.

18. In a voting machine, a registering mechanism, a sliding pawl for actuating the same that is normally out of position to actuate the registering mechanism when moved, a locking-bar slidable parallel with the pawl, and means connected with the locking-bar that moves the sliding pawl to actuate the register during the return movement of the locking bar and pawl.

19. In a voting machine, a series of registering mechanisms, a sliding pawl for actuating each registering mechanism, a locking-bar for each registering mechanism, said locking-bars abutting against each other, and means connected with each sectional locking-bar that moves the sliding pawl to actuate the register.

20. In a voting machine, the combination with a suitable frame, of two kinds of sectional plates one pair for each candidate, said plates abutting against each other and removably secured to the frame of the machine, one of said plates having mounted on it a registering and indicating mechanism, a perforated face plate over the indicating mechanism, and a pawl for actuating the register, the other sectional plate having mounted on it a pivotal arm that engages said pawl.

21. In a voting machine, a booth with entrance and exit doors, an indicator comprising a shaft and an index finger secured thereon outside of the booth and a yoke on such shaft, a sliding frame in the machine provided with a pin engaging such yoke, and means connecting the doors of the booth to such frame.

22. In a voting machine, a suitable registering mechanism, a sliding pawl for actuating the same, a voting key independent of the sliding pawl for pushing it in position to actuate the register, and means actuated by said key for preventing the actuation of other registering mechanisms.

23. In a voting machine, a registering mechanism, a sliding pawl for actuating the same that is normally out of position to actuate the registering mechanism when moved, means independent of the sliding pawl for returning it to normal and actuating the registering mechanism, and means for preventing the actuation of the other registering mechanisms.

24. In a voting machine, a registering mechanism, a disconnected sliding pawl for actuating the same that is normally out of position to actuate the registering mechanism when moved, a voting key independent of the sliding pawl for pushing it in position to actuate the registering mechanism, means independent of the sliding pawl for returning it and actuating the register mechanism, and means for preventing the actuation of other registering mechanisms.

25. In a voting machine, a movable frame for actuating the parts of the machine, push rods independently mounted in the machine that engage and actuate said movable frame, and means for actuating said push rods.

26. In a voting machine, a movable frame for actuating the parts of the machine, entrance and exit doors, and push rods operated by said doors which engage and move said frame.

27. In a voting machine, a booth with entrance and exit doors, a catch on the entrance door, a bar pivoted on the booth with a hook on one end in position to engage and hold the catch on the entrance door, and means on the exit door for engaging such bar and releasing it from the catch on the entrance door.

28. In a voting machine, a registering mechanism for each candidate for an office, a series of locking-bars that will prevent the actuation of the registering mechanisms for all such candidates, a sliding plate across said series of locking-bars, means whereby said sliding plate will prevent the operation of the locking-bars, and means controlled by the election officer for operating the sliding plate.

29. In a voting machine, a registering mechanism for each candidate for an office, a series of locking-bars that will prevent the actuation of the registering mechanisms for all such candidates, a notched sliding plate across said series of locking-bars, a pin on the locking-bar that normally registers with the notch in the sliding plate, and means controlled by the election officer for moving said sliding plate whereby it will engage the pin on the locking-bar and prevent its movement.

30. In a voting machine, registers for the various candidates, those for the candidates for each office being arranged in a row, a series of locking-bars for each row of registering mechanisms, a notched sliding plate crossing the series of locking-bars, screw pins in the locking-bars which may be set so as to enter the notches in the sliding plate when the latter is not operated and to engage the sliding plate when it is operated and prevent the movement of the locking-bars, and means for operating said sliding plate.

31. In a voting machine, a lever operated after voting, a registering mechanism for each candidate for an office, a series of locking-bars that will prevent the actuation of the registering mechanisms for all such candidates, a sliding plate across said series of locking-bars, means whereby said sliding plate will prevent the operation of the locking bars, means controlled by the election officer for operating the sliding plate, a pawl for engaging said sliding plate and holding it in its operated position, and means actuated by the said lever for releasing said pawl.

32. In a voting machine, a registering mechanism for each candidate for an office, a series of locking-bars that will prevent the actuation of the registering mechanisms for all such candidates, a sliding plate across said series of locking-bars, means whereby said sliding plate will prevent the operation of the locking-bar, a pawl for engaging said sliding plate and holding it in its operated position, and means for simultaneously actuating the registers and releasing said pawls.

33. In a voting machine, a ballot holder consisting of a plate with tongues punched through said plate and turned up to receive and hold the ballot, and an indicating mechanism behind the openings in said plate caused by punching out said tongues.

34. In a voting machine, a suitable casing, a ballot holder for each ticket slidably mounted in the casing so that in one position it cannot be removed therefrom and in the other position it can be removed therefrom, and means controlled by the election officer for moving said ballot holder whereby it can be removed.

35. In a voting machine, a suitable frame, a ballot holder for each ticket slidably mounted therein so that when it is in one position it will not be removable but when in the other position will be removable, a rock shaft provided with a pin that engages said ballot holder, suitable indicating mechanism behind the ballot holder that is hidden from view when the ballot holder is in one position, means for operating said rock shaft, and a stop for limiting the movement of the rock shaft whereby the ballot holder will be stopped in a position to disclose the indicators.

36. In a voting machine, suitable ballot holders, means whereby the election officer can move the ballot holders, and means for preventing such movement of the ballot holders while the machine is being used by a voter.

37. In a voting machine, a repeater including a sliding base plate, a stationary bar, levers pivoted to said plate with one end bearing against said bar, a movable plate with slots through which pins from the ends of said levers operate, and means for actuating said levers whereby the sliding base plate and parts mounted thereon are moved.

38. In a voting machine, locking-bars for multiple candidates on multiple tickets, a repeater with a suitable plate adjacent to the locking-bars, a series of pins on said plate, and a series of locking blocks having a beveled corner to be engaged by the locking-bars and a slot whereby the blocks are mounted on said pins and guided, said blocks abutting against each other and the whole series of blocks having a limited movement not greater than the width of the locking-bar.

39. In a voting machine, a repeater including a sliding base plate 162, the stationary bar 167, the levers 165 pivoted to the base plate between their ends with one end of said lever engaging said bar, the movable plate 170 having vertical slots therein to receive pins from said levers, and springs acting on said levers tending to withdraw the plate 170.

40. In a voting machine, locking-bars for multiple candidates on multiple tickets, a repeater in engagement with said locking-bars, an unlocking plate laterally movable that engages the operated locking-bars and returns them to the unoperated position, a key operated by a voter for actuating said unlocking plate, an indicating mechanism, and a connection between the unlocking plate and indicating mechanism for actuating the latter and showing the voter the number of times he has operated the repeater.

41. In a voting machine, a repeater, a key for operating said repeater, a stop mechanism for limiting the operation of the repeater including a rotating finger actuated progressively, a plate adjacent to said finger provided with a series of holes, and a removable pin for said holes that engages the rotating finger.

42. In a voting machine, a repeater, a shaft, a ratchet wheel on said shaft, means whereby each operation of the repeater operates the ratchet one notch, a finger secured on said shaft to rotate therewith, a plate adjacent to the finger with a series of holes, and a removable pin for said holes whereby the number of operations of the repeater is limited.

43. In a voting machine, means for voting for multiple candidates on multiple tickets, means for locking said voting means, a repeater adapted to unlock said locking mechanism, and means to prevent such use of the repeater.

44. In a voting machine, means for voting for multiple candidates on multiple tickets, locking-bars for locking said voting means, a repeater to unlock said locking-bars a certain number of times, and means on said locking-bars for preventing the operation of the repeater.

45. In a voting machine, means for voting for multiple candidates on multiple tickets, locking-bars for locking such voting means having on them pins, a repeater for unlocking said locking-bars, a lever to prevent the operation of said repeater, and a sliding plate that engages the pins on the locking-bars when the latter are operated.

46. In a voting machine, means for voting for multiple candidates on multiple tickets, locking-bars for locking said voting means having pins on them, a repeater provided with a plate 170 for moving the locking-bars back into normal position, the pins 200 on said plate, the lever 201 pivoted to the frame of the machine and engaging said pins and the sliding plate 203 pivoted to said lever 201 and having projections to engage the pins on the locking-bars when the latter are operated whereby through the plate 203 and lever 201 the lateral movement of the plate 170 will be prevented.

47. In a voting machine, means for voting for multiple candidates on multiple tickets, a movable frame for actuating the parts of the machine, a repeater, means for moving said repeater into actuating engagement with the rest of the machine provided with pins 200, the levers 211 pivoted to the frame of the machine and at one end pivoted to said movable frame and the bar 210 pivoted to the other end of said levers and which engages the pins on the repeater whereby when the movable frame is operated the repeater will be returned to its inoperative position.

48. In a voting machine, means for voting for multiple candidates on multiple tickets, a movable frame for actuating the parts of the machine, a repeater with the pins 161 extending therefrom, means for moving the repeater into actuating engagement with the rest of the machine, the hooks 207 pivoted to the frame of the machine for engaging said pins and holding the repeater in the actuating position, the levers 211 pivoted to the frame of the machine and at one end pivoted to said movable frame, the bar 210 pivoted to the other ends of said levers 211 and engaging the pins 161 and the pins 209 in said bar that engage the hooks 207 whereby, when the movable frame is operated, said hooks 207 will be released and the repeater returned to its unoperated position.

In witness whereof, I have hereunto affixed my signature in the presence of the witnesses herein named.

EDWIN B. CUMMINGS.

Witnesses:
M. C. BUCK,
G. H. BLAKER.